US012676353B2

(12) United States Patent
Zhou et al.

(10) Patent No.: US 12,676,353 B2
(45) Date of Patent: Jul. 7, 2026

(54) ENERGY STORAGE SYSTEM AND ENERGY STORAGE POWER STATION

(71) Applicant: Sungrow Energy Storage Technology Co., Ltd., Hefei (CN)

(72) Inventors: Meng Zhou, Hefei (CN); Wei Zhang, Hefei (CN); Huadong Li, Hefei (CN)

(73) Assignee: Sungrow Energy Storage Technology Co., Ltd., Hefei (CN)

( * ) Notice: Subject to any disclaimer, the term of this patent is extended or adjusted under 35 U.S.C. 154(b) by 551 days.

(21) Appl. No.: 18/350,056

(22) Filed: Jul. 11, 2023

(65) Prior Publication Data

US 2024/0072323 A1      Feb. 29, 2024

(30) Foreign Application Priority Data

Aug. 29, 2022    (CN) .......................... 202222286328.7

(51) Int. Cl.
| | |
|---|---|
| *H01M 10/613* | (2014.01) |
| *H01M 10/42* | (2006.01) |
| *H01M 10/627* | (2014.01) |
| *H01M 10/6568* | (2014.01) |
| *H01M 50/204* | (2021.01) |
| *H01M 50/251* | (2021.01) |
| *H01M 50/258* | (2021.01) |
| *H01M 50/298* | (2021.01) |

(52) U.S. Cl.
CPC ....... *H01M 10/613* (2015.04); *H01M 10/425* (2013.01); *H01M 10/627* (2015.04); *H01M 10/6568* (2015.04); *H01M 50/204* (2021.01); *H01M 50/251* (2021.01); *H01M 50/258* (2021.01); *H01M 50/298* (2021.01); *H01M 2010/4271* (2013.01); *H01M 2220/10* (2013.01)

(58) Field of Classification Search
CPC ............. H01M 10/613; H01M 10/627; H01M 10/6568; H01M 50/251; H01M 50/258; H01M 50/298; H01M 50/204; H01M 10/425; H01M 2010/4271; H01M 2210/10; H01M 10/42
See application file for complete search history.

(56) References Cited

U.S. PATENT DOCUMENTS

2019/0103641 A1    4/2019   O'Hora
2022/0223965 A1*   7/2022   Roh ..................... H01M 50/258

OTHER PUBLICATIONS

First Examination Report for Australian Patent Application No. 2023204341, dated Jun. 24, 2024.

* cited by examiner

*Primary Examiner* — Robert L Deberadinis
(74) *Attorney, Agent, or Firm* — Wolf, Greenfield & Sacks, P.C.

(57) ABSTRACT

An energy storage system and an energy storage power station are provided. The energy storage system includes a cabinet body, a control module, and a battery cluster module and a liquid cooling module which are arranged in the cabinet body. The battery cluster module includes at least two battery clusters arranged side by side. In a height direction of the cabinet body, at least one of the battery clusters and a liquid cooling unit of the liquid cooling module are sequentially distributed, and at least another one of the battery clusters and a switching and current converging unit of the control module are sequentially distributed.

14 Claims, 4 Drawing Sheets

ENERGY STORAGE SYSTEM AND ENERGY STORAGE POWER STATION

The present application claims priority to Chinese Patent Application No. 202222286328.7, titled "ENERGY STORAGE SYSTEM AND ENERGY STORAGE POWER STATION", filed on Aug. 29, 2022 with the China National Intellectual Property Administration, which is incorporated herein by reference in its entirety.

FIELD

The present application relates to the technical field of energy storage, and in particular to an energy storage system and an energy storage power station.

BACKGROUND

With the increasing demand for industrial and commercial energy storage, industrial and commercial energy storage products are developing rapidly. With the requirements for the increase in the electricity and a small volume of an energy storage system, a conventional air cooling energy storage product can no longer meet the demand.

In order to meet the requirements for heat dissipation and a small volume, a liquid cooling energy storage system is gradually widely used. However, the conventional liquid cooling energy storage system still occupies a large area and the heat dissipation efficiency needs to be improved.

In summary, how to design an energy storage system to reduce the occupied area has attracted attention of those skilled in the art.

SUMMARY

In view of this, an object of the present application is to provide an energy storage system, so as to reduce an occupied area. Another object of the present application is to provide an energy storage power station including the energy storage system.

In order to achieve the above objects, the following technical solutions are provided according to the present application.

An energy storage system includes a cabinet body, a control module, and a battery cluster module and a liquid cooling module, where the battery cluster module and the liquid cooling module are arranged in the cabinet body;

where the battery cluster module includes at least two battery clusters arranged side by side;

the liquid cooling module includes a liquid cooling unit and a liquid cooling pipeline, the liquid cooling unit is configured to supply a coolant, and the liquid cooling pipeline is configured to connect the liquid cooling unit with the battery cluster module to form a liquid cooling circuit;

the control module includes a switching and current converging unit arranged in the cabinet body, where the switching and current converging unit is configured to perform current convergence of any two battery clusters in parallel connection of the at least two battery clusters, and control an on-off state of the battery cluster module and control a battery cluster management unit;

in a height direction of the cabinet body, at least one of the battery clusters and the liquid cooling unit are sequentially distributed, and at least another one of the battery clusters and the switching and current converging unit are sequentially distributed.

In an embodiment, any two of the battery clusters are sequentially distributed in an X-direction; and the liquid cooling unit and the switching and current converging unit are sequentially distributed in the X-direction.

In an embodiment, in a longitudinal section of the cabinet body, the liquid cooling unit and the switching and current converging unit are distributed along a diagonal of the longitudinal section; where the longitudinal section is parallel to the X-direction and the height direction of the cabinet body.

In an embodiment, the liquid cooling unit is arranged at a top end of at least one of the battery clusters, and the switching and current converging unit is arranged at a bottom end of at least another one of the battery clusters;

where the battery cluster arranged at a bottom end of the liquid cooling unit is a first battery cluster, and the battery cluster arranged at a top end of the switching and current converging unit is a second battery cluster;

the switching and current converging unit is arranged at a bottom end of the cabinet body, the liquid cooling unit is arranged at a top end of the cabinet body, the first battery cluster extends from the bottom end of the cabinet body to the liquid cooling unit, and the second battery cluster extends from the switching and current converging unit to the top end of the cabinet body;

the first battery cluster is adjacent to the second battery cluster; or a third battery cluster is provided between the first battery cluster and the second battery cluster, and the third battery cluster extends from the bottom end of the cabinet body to the top end of the cabinet body.

In an embodiment, the cabinet body is provided with at least one battery compartment for accommodating the at least two battery clusters, and the switching and current converging unit is arranged in one of the at least one battery compartment.

In an embodiment, the cabinet body is provided with at least one battery compartment for accommodating the at least two battery clusters, and a liquid cooling unit compartment for accommodating the liquid cooling unit;

where in the height direction of the cabinet body, the at least one battery compartment and the liquid cooling unit are sequentially distributed.

In an embodiment, the cabinet body is provided with two cabinet doors, the number of the at least one battery compartment is two or more, one of the cabinet doors is configured to seal the liquid cooling unit compartment and the battery compartment corresponding to the liquid cooling unit compartment, the other of the cabinet doors is configured to seal other battery compartments of the two or more battery compartments, and the switching and current converging unit is provided in one of the other battery compartments.

In an embodiment, a side plate, proximate to the switching and current converging unit, of the cabinet body is provided with a threading structure for an output wire of the switching and current converging unit to pass through.

In an embodiment, the cabinet body is provided with a liquid cooling unit compartment for accommodating the liquid cooling unit, and a liquid cooling air inlet and a liquid cooling air outlet both in communication with the liquid cooling unit compartment;

where the liquid cooling air outlet is provided with an air guiding assembly, and the air guiding assembly is configured to guide the liquid cooling air outlet to supply air toward a side away from the liquid cooling air inlet.

FIG. 4 is a schematic view showing an internal structure of the energy storage system according to an embodiment of the present application.

| Reference numerals in FIGS. 1 to 4 are listed as follows: | |
| --- | --- |
| 100 battery cluster module, | 200 liquid cooling module, |
| 300 control module, | 400 fire-fighting module, |
| 900 cabinet body, | 1000 supplementary unit; |
| 101 battery module, | 102 first battery cluster, |
| 103 second battery cluster, | 104 fuse; |
| 201 liquid cooling unit, | 202 liquid cooling main pipeline, |
| 203 liquid cooling branch pipeline; | |
| 301 switching and current converging unit, | 302 emergency stop unit, |
| 303 indication unit; | |
| 401 fire-fighting connecting port, | 402 fire-fighting gas inlet, |
| 403 fire-fighting gas outlet, | 404 gas fire-fighting unit, |
| 405 fire-fighting detection unit; | |
| 501 first water receiving tray, | 502 second water receiving tray; |
| 601 liquid cooling air inlet, | 602 liquid cooling air outlet, |
| 603 liquid cooling drainage outlet; | |
| 701 lifting corner member, | 702 top corner member; |
| 801 forklift hole, | 802 fixing member; |
| 901 top cover, | 903 cabinet main body, |
| 902 base, | 904 threading plate, |
| 905 cabinet door, | 906 liquid cooling unit compartment, |
| 907 battery compartment, | 908 threading hole; |
| 1001 fixed bracket, | 1002 converter. |

In an embodiment, the energy storage system further includes a supplementary unit, where the supplementary unit is arranged outside the cabinet body for the energy storage system to supplement electricity to an energy storage power station.

Based on the above energy storage system, an energy storage power station is further provided according to the present application. The energy storage power station includes the above energy storage system with the supplementary unit.

In the energy storage system according to the present application, the battery cluster module includes at least two battery clusters arranged side by side. In the height direction of the cabinet body, at least one of the battery clusters and the liquid cooling unit are sequentially distributed, and at least another one of the battery clusters and the switching and current converging unit are sequentially distributed, which fully utilizes the space in the height direction of the cabinet body, effectively reduces an occupied area of the entire cabinet body, thereby reducing an occupied area of the energy storage system.

BRIEF DESCRIPTION OF THE DRAWINGS

For more clearly illustrating the technical solutions in the embodiments of the present application or in the conventional technology, the accompanying drawings used in the description of the embodiments or the conventional technology will be briefly described hereinafter. Apparently, the accompanying drawings described hereinafter illustrate only embodiments of the present application, and other drawings can be obtained by those skilled in the art based on the drawings without any creative efforts.

DETAILED DESCRIPTION OF THE EMBODIMENTS

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by those skilled in the art without any creative efforts, fall into the scope of protection of the present application.

In a conventional liquid cooling energy storage system, a liquid cooling module for liquid cooling a battery cluster module is generally arranged outside a cabinet body, which increases an occupied area. Alternatively, a liquid cooling compartment arranged side by side with a battery compartment is separately provided in the cabinet, and the liquid cooling module is arranged in the liquid cooling compartment, which also increases the occupied area.

It can be understood that the battery cluster module is accommodated in the battery compartment.

In addition, in the liquid cooling energy storage system, a control cabin arranged side by side with the battery compartment is separately provided in the cabinet, and a main unit (a switching and current converging unit) of the control module is arranged in the control cabin, which also leads to a large occupied area of the entire system.

Figure 4:
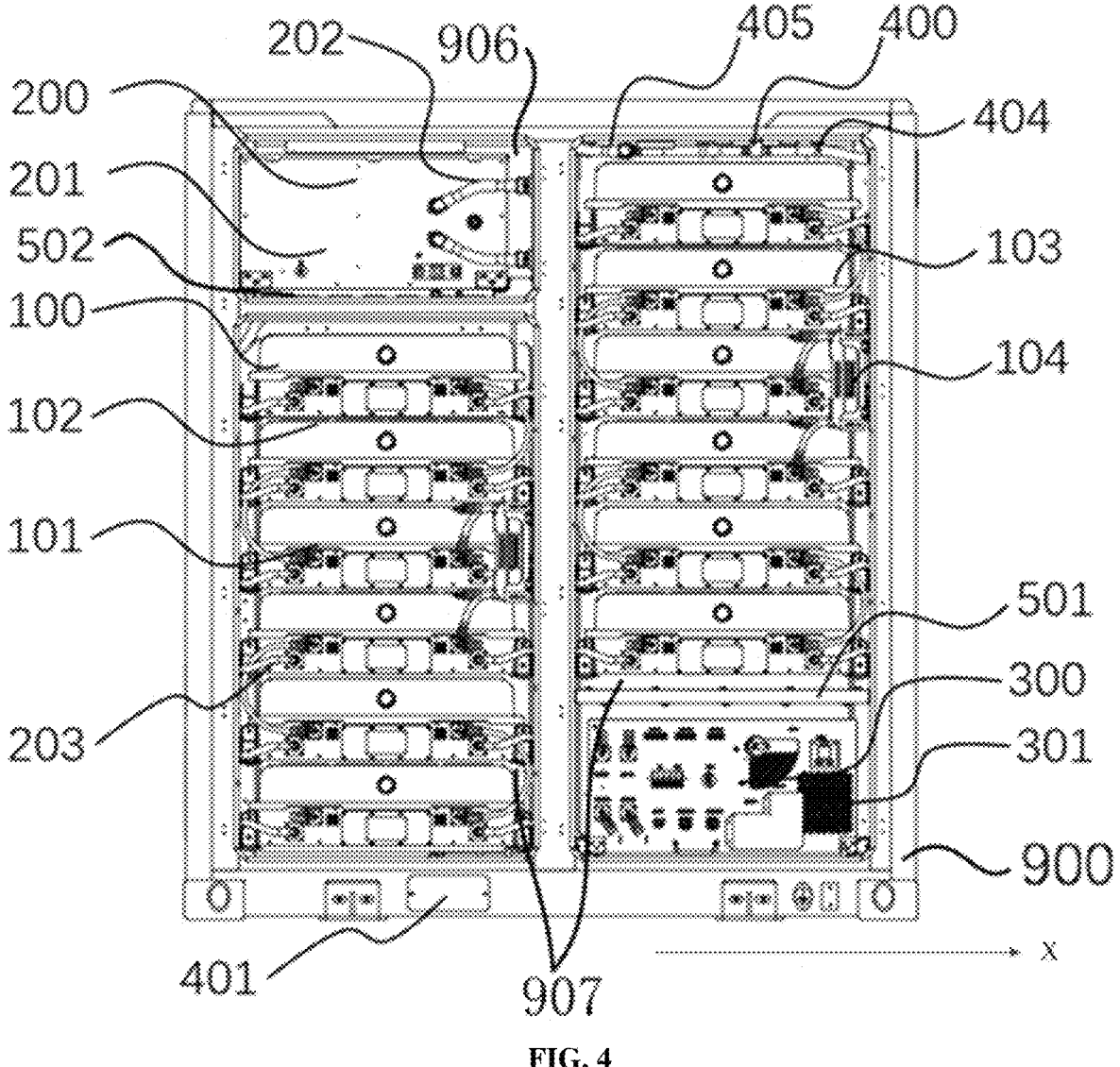

In order to solve the above problems, an energy storage system is provided according to an embodiment of the present application. As shown in FIG. 4, the energy storage system includes a cabinet body 900, a control module 300, a battery cluster module 100 and a liquid cooling module 200, and the battery cluster module 100 and the liquid cooling module 200 are arranged in the cabinet body 900.

The battery cluster module 100 includes at least two battery clusters arranged side by side. It should be noted that each of the battery clusters includes at least one battery module 101. If two or more battery modules 101 are provided in each of the battery clusters, any two battery modules 101 in the battery cluster are sequentially distributed along a height direction of the cabinet body 900. In each battery cluster, any two of the battery modules 101 are connected in series. In order to improve safety performance, a fuse 104 may be connected in series between two battery modules 101, as shown in FIG. 4.

In practical application, a storage electricity of the energy storage system can be adjusted by adjusting the number of the battery modules 101 and the number of the battery clusters, thereby realizing the expansion of the electricity.

The liquid cooling module 200 is configured to liquid cooling the battery cluster module 100. Specifically, the liquid cooling module 200 includes a liquid cooling unit 201 and a liquid cooling pipeline, the liquid cooling unit 201 is configured to supply a coolant, and the liquid cooling pipeline is configured to connect the liquid cooling unit 201 with the battery cluster module 100 to form a liquid cooling circuit.

The liquid cooling pipeline includes two liquid cooling main pipelines 202 and a liquid cooling branch pipeline 203. One of the liquid cooling main pipelines 202 is a discharge main pipeline, the other of the liquid cooling main pipelines 202 is a return main pipeline. An inlet of the liquid cooling branch pipeline 203 is in communication with the discharge main pipeline, and an outlet of the liquid cooling branch pipeline 203 is in communication with the return main pipeline. A liquid cooling member of the battery module 101 is connected in series to the liquid cooling branch pipeline 203.

It can be understood that the number of the liquid cooling branch pipeline 203 is at least two, and any two of the liquid cooling branch pipelines are connected in parallel.

The control module 300 includes a switching and current converging unit 301 which is arranged in the cabinet body 900. The switching and current converging unit 301 is configured to perform current convergence of any two battery clusters in parallel connection of the at least two battery clusters, and control an on-off state of the battery cluster module 100 and control a battery cluster management unit.

In a height direction of the cabinet body 900, at least one of the battery clusters and the liquid cooling unit 201 are sequentially distributed, and at least another one of the battery clusters and the switching and current converging unit 301 are sequentially distributed.

At least one of the battery clusters and the liquid cooling unit 201 are sequentially distributed in the height direction of the cabinet body 900. Specifically, in the height direction of the cabinet body 900, at least one of the battery clusters is arranged at a bottom end of the liquid cooling unit 201 or at least one of the battery clusters is arranged at a top end of the liquid cooling unit 201. For example, one battery cluster may be arranged at the bottom end of the liquid cooling unit 201 or at the top end of the liquid cooling unit 201. Alternatively, both two battery clusters may be arranged at the bottom end of the liquid cooling unit 201 or at the top end of the liquid cooling unit 201.

At least another one of the battery clusters and the switching and current converging unit 301 are sequentially distributed in the height direction of the cabinet body 900. Specifically, in the height direction of the cabinet body 900, at least another one of the battery clusters is arranged at a bottom end of the switching and current converging unit 301 or at a top end of the switching and current converging unit 301. For example, one battery cluster may be arranged at the bottom end of the switching and current converging unit 301 or at the top end of the switching and current converging unit 301. Alternatively, both two battery clusters may be arranged at the bottom end of the switching and current converging unit 301 or at the top end of the switching and current converging unit 301.

In practical application, at least one of the battery clusters being arranged at the bottom end of the liquid cooling unit 201 or at least one of the battery clusters being arranged at the top end of the liquid cooling unit 201, and at least another one of the battery clusters being arranged at the bottom end of the switching and current converging unit 301 or at least another one of the battery clusters being arranged at the top end of the switching and current converging unit 301 may be combined arbitrarily. Specifically, there are cases that at least one of the battery clusters is arranged at the bottom end of the liquid cooling unit 201 and at least another one of the battery clusters is arranged at the bottom end of the switching and current converging unit 301, at least one of the battery clusters is arranged at the bottom end of the liquid cooling unit 201 and at least another one of the battery clusters is arranged at the top end of the switching and current converging unit 301, at least one of the battery clusters is arranged at the top end of the liquid cooling unit 201 and at least another one of the battery clusters is arranged at the bottom end of the switching and current converging unit 301, and at least one of the battery clusters is arranged at the top end of the liquid cooling unit 201 and at least another one of the battery clusters is arranged at the top end of the switching and current converging unit 301.

In one aspect, the switching and current converging unit 301, the liquid cooling unit 201, and a same battery cluster are sequentially distributed in the height direction of the cabinet body 900. For example, the switching and current converging unit 301 and the liquid cooling unit 201 are arranged at the top end of the same battery cluster, or the switching and current converging unit 301 and the liquid cooling unit 201 are arranged at the bottom end of the same battery cluster, or one of the switching and current converging unit 301 and the liquid cooling unit 201 is arranged at the top end of the same battery cluster, and the other one of the switching and current converging unit 301 and the liquid cooling unit 201 is arranged at the bottom end of the same battery cluster.

In another aspect, the switching and current converging unit 301 and a battery cluster are sequentially distributed, and the liquid cooling unit 201 and a battery cluster different from the above battery cluster are sequentially distributed in the height direction of the cabinet body 900. Specifically, in the height direction of the cabinet body 900, the battery cluster sequentially distributed with the liquid cooling unit 201 and the battery cluster sequentially distributed with the switching and current converging unit 301 are different battery clusters.

In the energy storage system according to the above embodiments, the battery cluster module 100 includes at least two battery clusters arranged side by side. In the height direction of the cabinet body 900, at least one of the battery clusters and the liquid cooling unit 201 are sequentially distributed, and at least another one of the battery clusters and the switching and current converging unit 301 are sequentially distributed, which fully utilizes the space in the height direction of the cabinet body 900, effectively reduces an occupied area of the entire cabinet body 900, thereby reducing an occupied area of the energy storage system.

In order to optimize the layout, any two of the battery clusters may be sequentially distributed in an X-direction as shown in FIG. 4. The X-direction may be a length direction or a width direction of the cabinet body 900. In the X-direction, the liquid cooling unit 201 and the switching and current converging unit 301 are sequentially distributed. Therefore, the liquid cooling unit 201 and a battery cluster are sequentially distributed, and the switching and current converging unit 301 and a battery cluster different from the above battery cluster are sequentially distributed in the height direction of the cabinet body 900, which can effectively reduce a height of the cabinet body 900, improve the stability, and facilitate the operation and maintenance of the top of the cabinet body 900.

It can be understood that, in the above distribution structure, the switching and current converging unit 301 and a battery cluster are sequentially distributed, and the liquid cooling unit 201 and a battery cluster different from the above battery cluster are sequentially distributed in the height direction of the cabinet body 900.

Further, in a longitudinal section of the cabinet body 900, the liquid cooling unit 201 and the switching and current converging unit 301 are distributed along a diagonal of the longitudinal section. The longitudinal section is a section taken along the height direction of the cabinet body 900. It should be noted that, the longitudinal section of the cabinet body 900 is parallel to the X-direction and the height direction of the cabinet body 900.

In the above distribution structure, a sum of distances from all the battery clusters to the liquid cooling unit 201 and a sum of distances from all the battery clusters to the switching and current converging unit 301 are effectively shortened, thereby shortening the liquid cooling pipelines and the lines, and facilitating the arrangement of the liquid cooling pipelines and lines.

The switching and current converging unit 301 generally needs to be connected with a reserved line on the ground. In order to facilitate the mounting of the energy storage system, in an embodiment, the liquid cooling unit 201 is arranged at the top end of at least one of the battery clusters, and the switching and current converging unit 301 is arranged at the bottom end of at least another one of the battery clusters.

In the above energy storage system, the battery cluster arranged at a bottom end of the liquid cooling unit 201 is a first battery cluster 102, and the battery cluster arranged at a top end of the switching and current converging unit 301 is a second battery cluster 103. The switching and current converging unit 301 is arranged at a bottom end of the cabinet body 900, the liquid cooling unit 201 is arranged at a top end of the cabinet body 900, the first battery cluster 102 extends from the bottom end of the cabinet body 900 to the liquid cooling unit 201, and the second battery cluster 103 extends from the switching and current converging unit 301 to the top end of the cabinet body 900. It can be understood that the first battery cluster 102 and the second battery cluster 103 are not the same battery cluster.

With the above structure, the misaligned arrangement of the first battery cluster 102 and the second battery cluster 103 is realized, that is, a bottom end of the first battery cluster 102 and a bottom end of the second battery cluster 103 are not aligned, and a top end of the first battery cluster 102 and a top end of the second battery cluster 103 are not aligned. The first battery cluster 102 and the second battery cluster 103 may be adjacent to each other or may not be adjacent to each other. If the first battery cluster 102 and the second battery cluster 103 are not adjacent to each other, that is, if a third battery cluster is provided between the first battery cluster 102 and the second battery cluster 103, the third battery cluster extends from the bottom end of the cabinet body 900 to the top end of the cabinet body 900.

It can be understood that, in order to fully utilize an internal space of the cabinet body 900, a bottom end of the third battery cluster and the bottom end of the first battery cluster 102 are aligned, and a top end of the third battery cluster and the top end of the second battery cluster 103 are aligned. In practical application, the bottom end of the third battery cluster and the bottom end of the first battery cluster 102 may be misaligned, and the top end of the third battery cluster and the bottom end of the second battery cluster 103 may be misaligned, which is not limited to the above embodiment.

The number of the first battery cluster 102 may be one, or two or more, the number of the second battery cluster 103 may be one, or two or more, and the number of the third battery cluster may be one, or two or more, which are selected according to actual needs, and is not limited in this embodiment.

In the energy storage system, if the first battery cluster 102 is adjacent to the second battery cluster 103, the first battery cluster 102 and the second battery cluster 103 each has a direct contact surface with the liquid cooling unit 201, and the first battery cluster 102 and the second battery cluster 103 each has a direct contact surface with the switching and current converging unit 301, which further shortens the sum of distances from all the battery clusters to the liquid cooling unit 201 and the sum of distances from all the battery clusters to the switching and current converging unit 301, shortens the liquid cooling pipelines and lines, and facilitates the arrangement of the liquid cooling pipelines and lines. If the third battery cluster is provided between the first battery cluster 102 and the second battery cluster 103, the first battery cluster 102 and the third battery cluster each has a direct contact surface with the liquid cooling unit 201, and the third battery cluster and the second battery cluster 103 each has a direct contact surface with the switching and current converging unit 301, which further shortens the sum of distances from all the battery clusters to the liquid cooling unit 201 and the sum of distances from all the battery clusters to the switching and current converging unit 301, shortens the liquid cooling pipelines and lines, and facilitates the arrangement of the liquid cooling pipelines and lines.

In the conventional liquid cooling energy storage system, the control unit dissipates heat through air cooling, generally introducing air outside the cabinet body into a control cabin where the control unit is arranged. The air outside the cabinet body with a high temperature results in a poor heat dissipation effect. In order to solve the above problem, in an embodiment, the cabinet body 900 is provided with at least one battery compartment 907 for accommodating the at least two battery clusters, and the switching and current converging unit 301 is arranged in one of the battery compartment 907. It should be noted that each battery compartment 907 is provided with at least one battery cluster. The battery compartment 907 is a sealed compartment, so as to ensure protection requirements.

In the energy storage system, the switching and current converging unit 301 is arranged in one battery compartment 907, and the switching and current converging unit 301 and one battery cluster are arranged in the same battery compartment 907, and the excess cold air in the battery compartment 907 can cool the switching and current converging unit 301, thereby achieving heat dissipation of the switching and current converging unit 301 and effectively improving the heat dissipation effect. Moreover, the heat dissipation effect is not affected by an ambient temperature outside the cabinet body 900.

In the above energy storage system, in order to facilitate the arrangement of the liquid cooling unit 201 and reduce the influence of the liquid cooling unit 201 on the battery cluster, the cabinet body 900 is provided with at least one battery compartment 907 for accommodating the at least two battery clusters, and a liquid cooling unit compartment 906 for accommodating the liquid cooling unit 201. In the height direction of the cabinet body 900, the at least one battery compartment 907 and the liquid cooling unit 201 are sequentially distributed.

It should be noted that, if the liquid cooling unit 201 is arranged at the top end of at least one battery cluster, the liquid cooling unit compartment 906 is arranged at the top end of the at least one battery compartment 907. If the liquid cooling unit 201 is arranged at the bottom end of at least one battery cluster, the liquid cooling unit compartment 906 is arranged at the bottom end of the at least one battery compartment 907. The liquid cooling unit compartment 906 may be a sealed compartment or an unsealed compartment.

Figure 1:
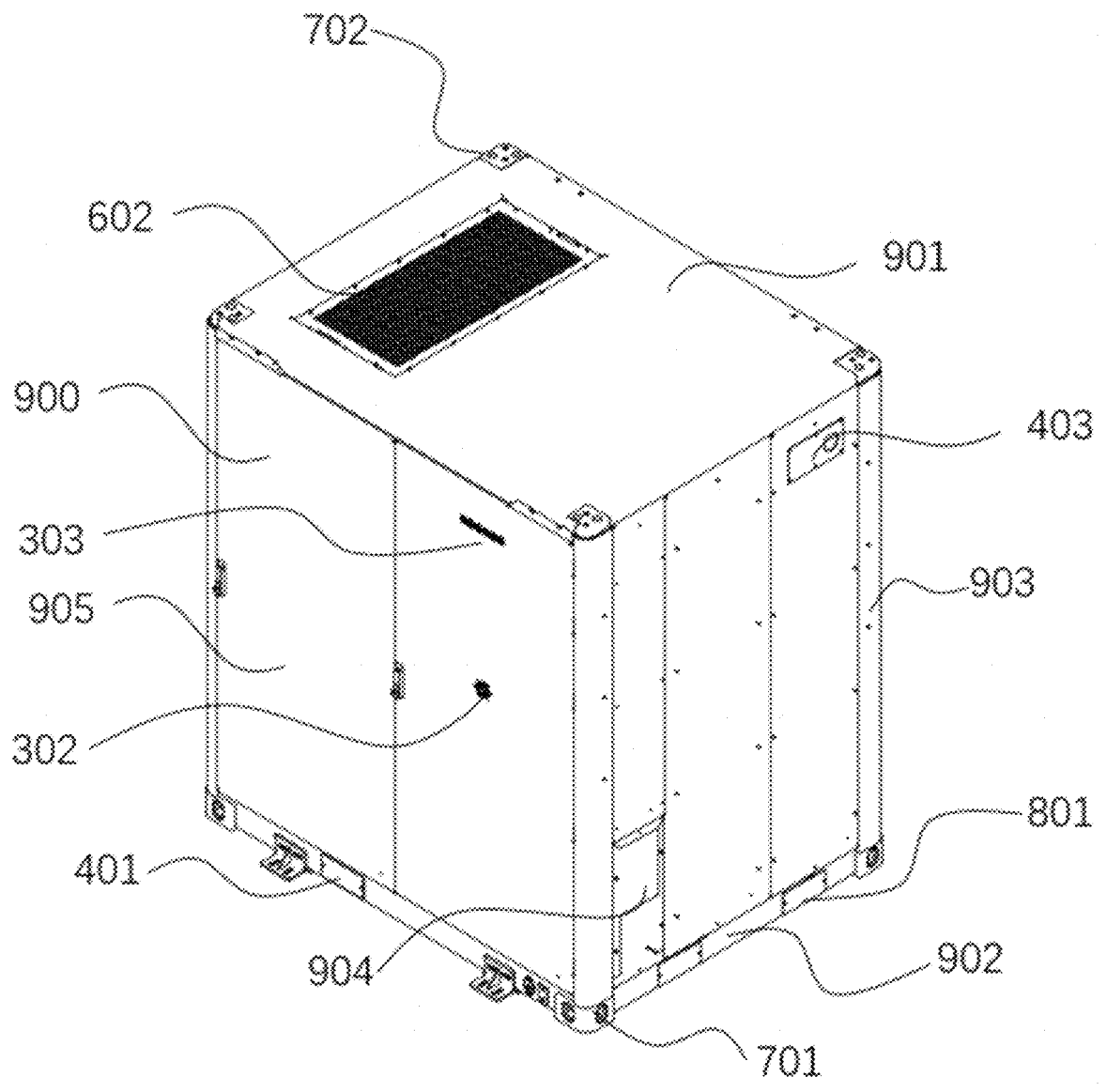
FIG. 1 is a schematic structural view of an energy storage system according to an embodiment of the present application.

In order to reduce the occupied area required for using the energy storage system, the cabinet body 900 is provided with two cabinet doors 905, as shown in FIG. 1. One cabinet door 905 seals the liquid cooling unit compartment 906 and the at least one battery compartment 907, the other cabinet door 905 seals other battery compartments 907, and the switching and current converging unit 301 is provided in one of the other battery compartments 907.

It should be noted that in a case that one cabinet door 905 seals the liquid cooling unit compartment 906 and the at least one battery compartment 907, the protection level of the cabinet door 905 on the liquid cooling unit compartment 906 is different from the protection level of the cabinet door 905 on the battery compartment 907, so as to meet the different requirements of the liquid cooling unit compartment 906 and the battery compartment 907.

The battery compartment 907 sealed by the cabinet door 905 that seals the liquid cooling unit compartment 906 only includes the battery compartment 907 that is sequentially distributed with the liquid cooling unit 201 in the height direction of the cabinet body 900, or the battery compartment 907 sealed by the cabinet door 905 that seals the liquid cooling unit compartment 906 includes the battery compartment 907 that is sequentially distributed with the liquid cooling unit 201 in the height direction of the cabinet body 900, and the battery compartment 907 that is distributed side by side with the liquid cooling unit compartment 906 in a direction perpendicular to the height direction of the cabinet body 900.

In the energy storage system, after one cabinet door 905 is opened, several battery clusters and the liquid cooling unit 201 can be operated and maintained. After the other cabinet door 905 is opened, the remaining battery clusters and the switching and current converging unit 301 can be operated and maintained. In this way, the liquid cooling unit 201 and the switching and current converging unit 301 can be operated and maintained without the need for separately arrangement of a cabinet door 905, thereby reducing the occupied area required for opening the cabinet door 905 and further reducing the occupied area required for using the energy storage system. At the same time, the liquid cooling unit compartment 906 and several battery compartments 907 share a common cabinet door, which is convenient to ensure the sealing effect and is more aesthetical.

In the cabinet body 900, in order to reduce the occupied area, the two cabinet doors 905 may be opposite doors. Alternatively, the two cabinet doors 905 may be of other structures, which is not limited in this embodiment.

In the cabinet body 900, the same cabinet door 905 may be provided to seal the liquid cooling unit compartment 906 and the battery compartment 907 in which the switching and current converging unit 301 is arranged. Alternatively, the number of the cabinet door 905 may be one. The arrangement and distribution of the cabinet door 905 are not limited to the above embodiment.

In order to facilitate the connection between the energy storage system and other devices, as shown in FIG. 1, a side plate, proximate to the switching and current converging unit 301, of the cabinet body 900 is provided with a threading structure for an output wire of the switching and current converging unit 301 to pass through. Specifically, the threading structure includes a threading plate 904 or a threading hole 908. It should be noted that, the threading structure is sealingly connected with the output wire of the switching and current converging unit 301, so as to ensure the protection requirements.

In the energy storage system, the switching and current converging unit 301 is arranged in one battery compartment 907. If the switching and current converging unit 301 is arranged at the bottom end of at least one battery cluster, condensed water on the at least one battery cluster and the liquid cooling pipeline is easy to drop on the switching and current converging unit 301, thus damaging the switching and current converging unit 301. In order to solve the above problems, as shown in FIG. 4, the energy storage system further includes a first water receiving tray 501 and a first drainage structure. The first water receiving tray 501 is arranged in the battery compartment 907 where the switching and current converging unit 301 is arranged, the first water receiving tray 501 is arranged between the switching and current converging unit 301 and the battery cluster at the top end of the switching and current converging unit 301, and the first water receiving tray 501 is configured to receive the condensed water. The first drainage structure is in communication with the first water receiving tray 501, and the first drainage structure is configured to drain the water in the first water receiving tray 501 to an exterior of the cabinet body 900.

The specific structure of the first drainage structure is selected according to actual needs. For example, the first drainage structure may be a drainage outlet or a drainage pipe. In order to improve the protective performance of the battery compartment 907, the first drainage structure may be the drainage pipe. The drainage structure penetrates through the cabinet body 900, extends to the exterior of the cabinet body 900 and is sealingly connected with the cabinet body 900.

Figure 2:
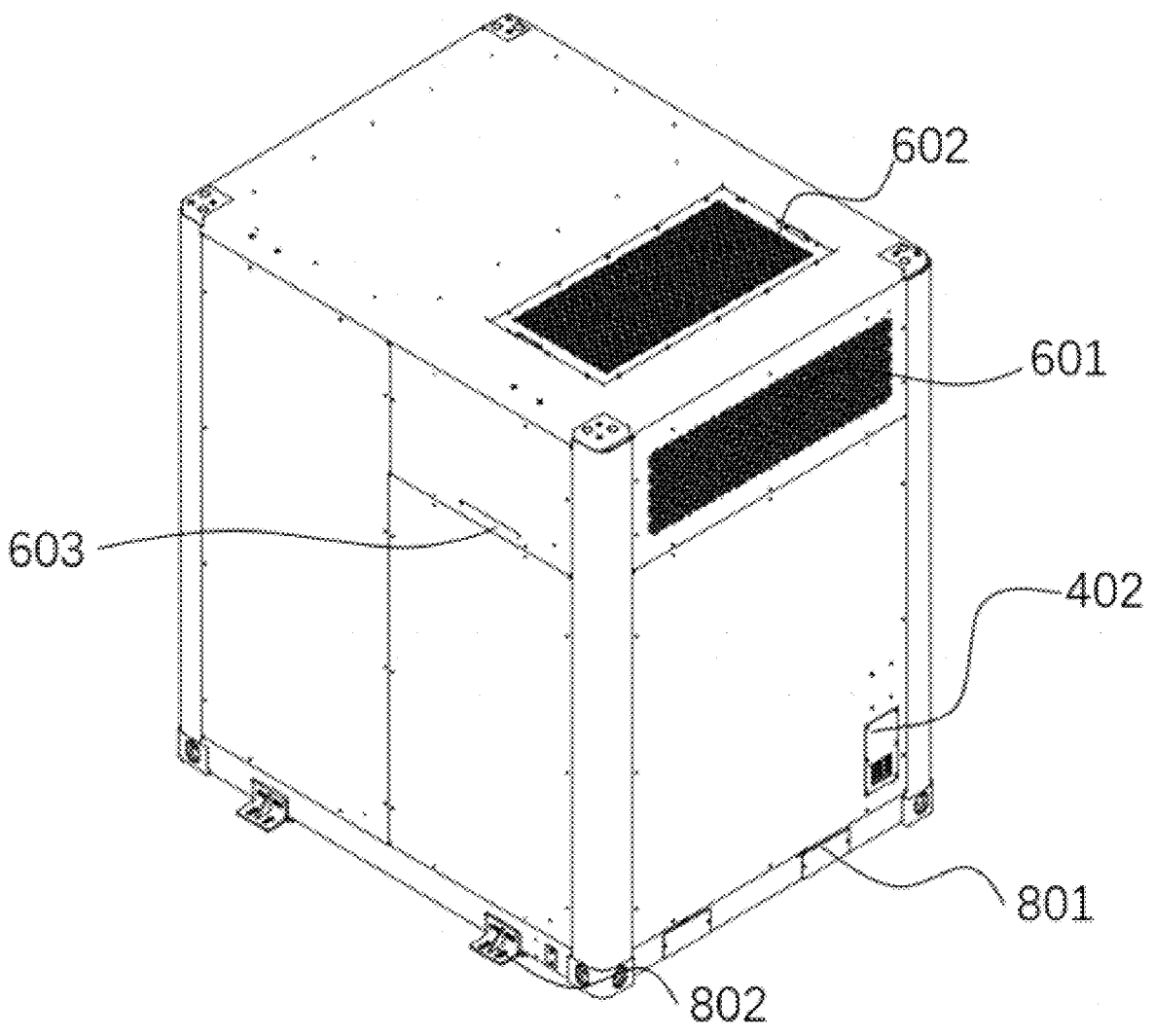
FIG. 2 is a schematic structural view of the energy storage system in FIG. 1 from another perspective.

In the energy storage system, in order to facilitate the liquid cooling unit 201 to provide a coolant, the coolant in the liquid cooling unit 201 may be cooled by using air cooling. Specifically, as shown in FIG. 1 and FIG. 2, the cabinet body 900 is provided with a liquid cooling unit compartment 906 for accommodating the liquid cooling unit 201, and a liquid cooling air inlet 601 and a liquid cooling air outlet 602 both in communication with the liquid cooling unit compartment 906. In this way, the cold air outside the cabinet body 900 enters the liquid cooling unit compartment 906 through the liquid cooling air inlet 601, cools the coolant in the liquid cooling unit 201, and is heated up to be hot air. The hot air is discharged outside the cabinet body 900 through the liquid cooling air outlet 602. At this time, the liquid cooling unit compartment 906 is an unsealed compartment.

In order to reduce the mounting space required for the energy storage system, the liquid cooling unit 201 may be arranged at the top end of at least one battery cluster. The liquid cooling air inlet 601 is arranged on a side surface of the cabinet body 900, and the liquid cooling air outlet 602 is arranged on a top surface of the cabinet body 900. In this way, the space at the top of the cabinet body 900 is fully utilized to discharge the hot air. During the mounting of the energy storage system, a small gap may be reserved on a side of the cabinet body 900 where the liquid cooling air inlet 601 is arranged, thereby reducing the mounting space required for the energy storage system.

It can be understood that, the liquid cooling air inlet 601 is arranged on a side plate, adjacent to the cabinet door 905 and proximate to the liquid cooling unit 201, of the cabinet body 900.

In the energy storage system, the water outside the cabinet body 900, such as the rainwater, easily enters the liquid cooling unit compartment 906 through the liquid cooling air inlet 601 and the liquid cooling air outlet 602. In order to prevent the water in the liquid cooling unit compartment 906 from affecting the battery compartment 907, as shown in FIG. 4, the liquid cooling unit compartment 906 is provided with a second water receiving tray 502 and a second drainage structure. The second water receiving tray 502 is arranged at the bottom end of the liquid cooling unit 201, and is configured to receive the water entering the liquid cooling unit compartment 906 from the liquid cooling air outlet 602 and/or the liquid cooling air inlet 601. The second drainage structure is in communication with the second water receiving tray 502, and the second drainage structure is configured to drain the water in the second water receiving tray 502 to the exterior of the cabinet body 900.

The specific structure of the second drainage structure is selected according to actual needs. For example, the second drainage structure may be a drainage outlet or a drainage pipe. In order to simplify the structure, as shown in FIG. 2, the second drainage structure may be a liquid cooling drainage outlet 603.

In practical application, if the cabinet door 905 seals the liquid cooling unit compartment 906, the liquid cooling drainage outlet 603 may be arranged on a side plate, away from the cabinet door 905, of the cabinet body 900.

The above structure is particularly suitable for a case where the liquid cooling air inlet 601 is arranged on a side surface of the cabinet body 900, and the liquid cooling air outlet 602 is arranged on a top surface of the cabinet body 900.

In the energy storage system, the air enters from the liquid cooling air inlet 601 and leaves from the liquid cooling air outlet 602, the air inlet and the air outlet are easily affected by each other, thereby affecting the cooling effect. In order to reduce the influence between the air inlet and the air outlet, the liquid cooling air outlet 602 is provided with an air guiding assembly, and the air guiding assembly is configured to guide the liquid cooling air outlet 602 to supply air toward a side away from the liquid cooling air inlet 601.

The above structure is particularly suitable for the case where the liquid cooling air inlet 601 is close to the liquid cooling air outlet 602. For example, the liquid cooling air inlet 601 is arranged on the side surface of the cabinet body 900, and the liquid cooling air outlet 602 is arranged on the top surface of the cabinet body 900.

The type of the air guiding assembly is selected according to actual needs. For example, the air guiding assembly is, but is not limited to, a shutter, which is not limited in this embodiment.

In order to improve the protective performance, the liquid cooling air inlet 601 and the liquid cooling air outlet 602 each may be provided with a protective member, so as to reduce impurities such as dust from entering the liquid cooling unit compartment 906. The protective member may be a protective net or a shutter, which is not limited in this embodiment.

It should be noted that, if the liquid cooling air outlet 602 is provided with the air guiding assembly, the air guiding assembly may be the protective member.

In the actual application, the liquid cooling unit may cool the coolant by using other methods, such as water cooling or fluorine cooling, which is not limited to the above embodiments.

In an embodiment, in order to improve the safety performance, the energy storage system further includes a fire-fighting module 400.

In one aspect, the fire-fighting module 400 may include a water fire-fighting unit which is configured to spray water into the battery compartment 907 of the cabinet body 900.

The specific structure of the water fire-fighting unit is selected according to actual needs. Specifically, the water fire-fighting unit includes: a fire-fighting connecting port 401 defined on the cabinet body 900, a fire-fighting water pipe and a fire-fighting nozzle, and the fire-fighting water pipe and the fire-fighting nozzle are arranged inside the cabinet body 900. The fire-fighting nozzle is configured to spray water into the battery compartment 907 of the cabinet body 900, the fire-fighting nozzle is in communication with an outlet of the fire-fighting water pipe, the fire-fighting connecting port 401 is in communication with an inlet of the fire-fighting water pipe, and the fire-fighting connecting port 401 is configured to connect a fire-fighting equipment outside the cabinet body 900. It should be noted that, a fire-fighting nozzle is provided in each battery compartment 907.

In order to facilitate the fire-fighting and improve the fire-fighting effect, the fire-fighting connecting port 401 is defined at a bottom end of a side of the cabinet door of the cabinet body 900, and the fire-fighting nozzle is arranged at a top end of the battery compartment 907.

In practical application, the fire-fighting connecting port 401 and the fire-fighting nozzle may be arranged at other positions, which is not limited to the above embodiments.

In another aspect, the fire-fighting module 400 may include a fire-fighting ventilation assembly which is arranged in the cabinet body 900, and the fire-fighting ventilation assembly is configured to discharge a combustible gas in the battery compartment 907 of the cabinet body 900.

The specific structure of the fire-fighting ventilation assembly is selected according to actual needs. In an embodiment, the fire-fighting ventilation assembly includes a fire-fighting gas inlet 402, a fire-fighting gas outlet 403, a gas inlet valve for opening and closing the fire-fighting gas inlet 402, and a gas outlet valve for opening and closing the fire-fighting gas outlet 403, all of which are arranged at the cabinet body 900.

In order to improve the fire-fighting effect, the fire-fighting gas inlet 402 may be located on one side of the cabinet body 900, the fire-fighting gas outlet 403 may be located on another side of the cabinet body 900, and the fire-fighting gas inlet 402 may be lower than the fire-fighting gas outlet 403. It can be understood that the fire-fighting gas inlet 402 and the fire-fighting gas outlet 403 are respectively located on two opposite sides of the cabinet body 900.

In practical application, the fire-fighting gas inlet 402 and the fire-fighting gas outlet 403 may be distributed in other ways, which is not limited to the above embodiments.

In another aspect, the fire-fighting module 400 may include a gas fire-fighting unit 404 which is arranged in the cabinet body 900, and the gas fire-fighting unit 404 is configured to spray a fire-extinguishing gas into the battery compartment 907 of the cabinet body 900.

In order to improve the fire-fighting effect, the gas fire-fighting unit 404 may be arranged at the top end of the battery compartment 407. Alternatively, the gas fire-fighting unit 404 may be arranged at other positions, which is not limited in this embodiment.

The type of the gas fire-fighting unit 404 is selected according to actual needs. For example, the gas fire-fighting unit 404 is an aerosol fire extinguisher or a heptafluoropropane fire extinguisher, which is not limited in this embodiment.

In practical application, the above three aspects can be arbitrarily combined to improve the fire-fighting reliability and fire-fighting effect, thereby improving the safety performance of the energy storage system. Moreover, any combination of the above three aspects is more compatible with different needs.

In order to improve the fire-fighting reliability, the fire-fighting module 400 further includes a fire-fighting detection unit 405 which is arranged inside the cabinet body 900.

Specifically, if the fire-fighting module 400 includes the water fire-fighting unit, the fire-fighting detection unit 405 includes a smoke detector and a temperature detector, both the smoke detector and the temperature detector are in signal connection with the water fire-fighting unit, and the water fire-fighting unit performs fire-fighting based on detection values of the smoke detector and the temperature detector. For example, if the detection value of the smoke detector exceeds a set smoke value and the detection value of the temperature detector exceeds a set temperature value, the water fire-fighting unit performs fire-fighting, that is, the water fire-fighting unit sprays water into the battery compartment 907.

Alternatively, the fire-fighting detection unit 405 may include other detectors, which is not limited in this embodiment.

Specifically, if the fire-fighting module 400 includes the gas fire-fighting unit 404, the fire-fighting detection unit 405 includes a smoke detector and a temperature detector, both the smoke detector and the temperature detector are in signal connection with the gas fire-fighting unit, and the gas fire-fighting unit 404 performs fire-fighting based on detection values of the smoke detector and the temperature detector. For example, if the detection value of the smoke detector exceeds a set smoke value and the detection value of the temperature detector exceeds a set temperature value, the gas fire-fighting unit 404 performs fire-fighting, that is, the gas fire-fighting unit 404 sprays a fire-extinguishing gas into the battery compartment 907.

The fire-fighting detection unit 405 includes, but is not limited to, the smoke detector, the temperature detector or a combustible gas detector, and is configured to detect inside the cabinet body, so as to ensure timely feedback when danger occurs. Moreover, the fire-fighting module 400 can respond in time.

Specifically, if the fire-fighting module 400 includes the fire-fighting ventilation assembly, the fire-fighting detection unit 405 includes a combustible gas detector, the combustible gas detector is in signal connection with the fire-fighting ventilation assembly, and the fire-fighting ventilation assembly performs fire-fighting based on a detection value of the combustible gas detector. For example, if the detection value of the combustible gas detector exceeds a set value, the fire-fighting ventilation assembly performs fire-fighting, that is, the fire-fighting ventilation assembly discharges the combustible gas in the battery compartment 907.

In order to improve the detection accuracy, the fire-fighting detection value 405 may be arranged at the top of the battery compartment 907. Alternatively, the fire-fighting detection unit 405 may be arranged at other positions, which is not limited in this embodiment.

In an embodiment, the control module 300 further includes an emergency stop unit 302. The emergency stop unit 302 is arranged outside the cabinet body 900 and is configured to control the emergency stop of the energy storage system. In order to facilitate the emergency stop, the emergency stop unit 302 may be arranged on the cabinet door 905. In practical application, the position of the emergency stop unit 302 may be adjusted, which is not limited in this embodiment.

In an embodiment, the control module 300 further includes an indication unit 303. The indication unit 303 is arranged outside the cabinet body 900 and is configured to indicate an operating state of the energy storage system.

The operating state includes an on-off state, a charging state and an energy storage amount, which are set according to actual needs and are not limited in this embodiment.

The indication unit 303 may be an indicator light and/or an indication sign, which is set according to actual needs and is not limited in this embodiment. In order to facilitate the user to see the indication unit 303, the indication unit 303 may be arranged on the cabinet door 905.

In an embodiment, the cabinet body 900 includes a cabinet main body 903, a top cover 901 which is fixed at a top end of the cabinet main body 903, a base 902 which is fixed at a bottom end of the cabinet main body 903, and a cabinet door 905. The top end of the cabinet main body 903 is provided with a top plate, the bottom end of the cabinet main body 903 is provided with a bottom plate, the cabinet door 905 seals the cabinet main body 903, and the battery cluster module 100, the liquid cooling module 200 and the switching and current converging unit 301 are arranged inside the cabinet main body 903.

It should be noted that the battery compartment 907 and the liquid cooling unit compartment 906 are arranged inside the cabinet main body 903.

In the above structure, the cabinet body 900 is divided into the top cover 901, the base 902, the cabinet main body 903 and the cabinet door 905, which can effectively reduce the weight of a single member and facilitate processing and production. In addition, only a side of the cabinet door needs to be sealed in the cabinet main body 903, which can realize effective sealing and better color matching.

In practical application, the cabinet door 905 may be connected with the base 902 and/or the top cover 901, which is not limited to the case where the cabinet door 905 is connected with only the cabinet main body 903.

In practical application, if the cabinet body is provided with the threading structure, the threading structure is arranged on the cabinet main body 903. If the cabinet body 900 is provided with the liquid cooling air inlet 601 and the liquid cooling air outlet 602, the liquid cooling air inlet 601 may be defined on a side plate of the cabinet main body 903, and the liquid cooling air outlet 602 is formed by connecting a through hole on the top plate of the cabinet main body 903 with a through hole on the top cover. If the cabinet body 900 is provided with the fire-fighting connecting port 401, the fire-fighting connecting port 401 may be defined on the base 902. If the cabinet body 900 is provided with the fire-fighting gas inlet 402 and the fire-fighting gas outlet 403, the fire-fighting gas inlet 402 may be defined on a side plate of the cabinet main body 903, and the fire-fighting gas outlet 403 may be defined on another side plate of the cabinet main body 903.

In the above cabinet, the fixed connection between the top cover 901 and the cabinet main body 903 is detachable or non-detachable, and the fixed connection between the base 902 and the cabinet main body 903 is detachable or non-detachable. For example, the top cover 901 may be fixedly connected with the cabinet main body 903 by welding or fasteners, and the base 902 may be fixedly connected with the cabinet main body 903 by welding or fasteners, which are selected according to actual needs.

For the convenience of maintenance, the top cover 901 may be detachably and fixedly connected with the cabinet main body 903, and the base 902 may be detachably and fixedly connected with the cabinet main body 903. In order to facilitate assembly and disassembly, the top cover 901 may be fixedly connected with the cabinet main body 903 by threaded fasteners, and the base 902 may be fixedly connected with the cabinet main body 903 by threaded fasteners.

In order to facilitate the movement of the cabinet body 900, in one aspect, the base 902 may be provided with a forklift hole 801 for a forklift to insert into. In this way, the cabinet body 900 can be moved by the forklift. In another aspect, the base 902 may be provided with a lifting corner member 701 for lifting equipment to lift, so that the cabinet body 900 can be moved and lifted by forklift lifting equipment. In another aspect, the top cover 901 may be provided with a top corner member 702 for lifting equipment to lift, so that the cabinet body 900 can be moved and lifted by the forklift lifting equipment.

The above three aspects can be arbitrarily combined and selected according to actual needs.

The number of the forklift hole 801 may be one or two, and the specific position of the forklift hole 801 may be selected according to actual needs, which is not limited in this embodiment.

For lifting, the lifting corner members 701 may be distributed at four corners of the base 902, and the top corner members 702 may be distributed at four corners of the top cover 901.

In practical application, the number of the lifting corner members 701 and the top corner members 702 may be others, and the lifting corner members 701 and the top corner members 702 may be distributed in other ways, which are not limited to the above embodiments.

Generally, the cabinet body 900 needs to be fixed on a mounting surface. For example, the mounting surface is the bottom surface. For fixation, the base 902 may be provided with a fixing member 802, and the fixing member 802 is configured to fix to a mounting surface of the cabinet body 900.

The number of the fixing member 802 may be one, or two or more. The specific position and specific structure of the fixing member 902 may be selected according to actual needs, which is not limited in this embodiment.

The energy storage systems described hereinbefore are all industrial and commercial energy storage systems.

During the operation of the conventional energy storage power station, the loss of electricity of the energy storage system is inevitable, and a supplementary cabinet needs to be added year by year to maintain the stability of electricity. However, the industrial and commercial energy storage system cannot be used as a supplementary cabinet, that is, the industrial and commercial energy storage system cannot supplement the electricity of the energy storage power station. In this way, the use of the industrial and commercial energy storage system is limited.

Figure 3:
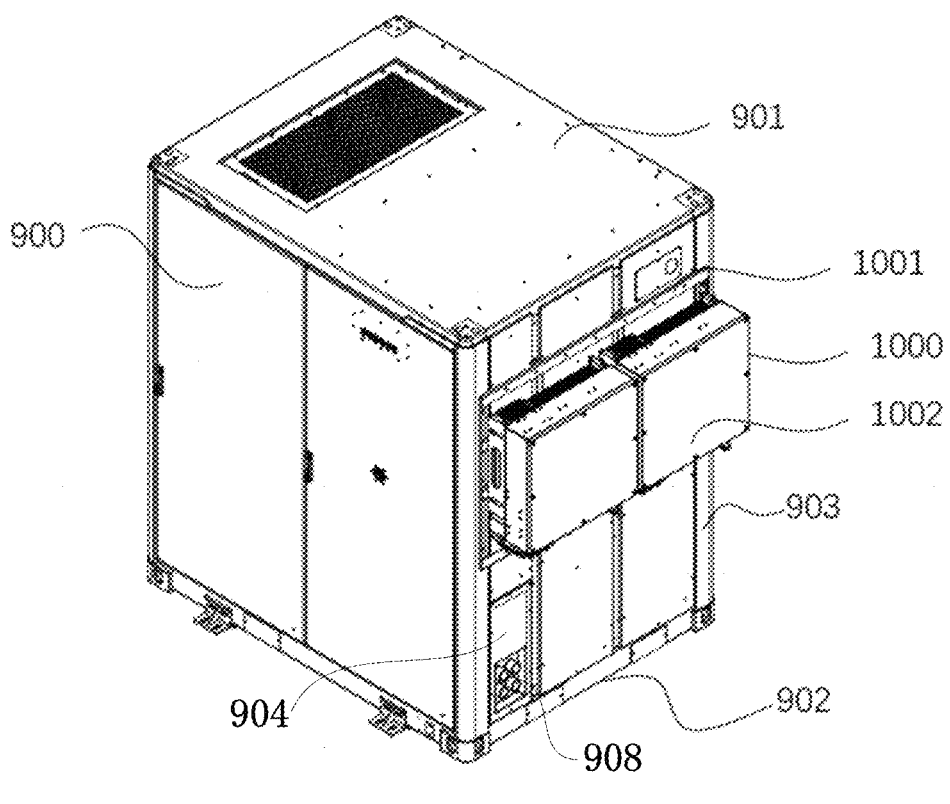
FIG. 3 is a schematic structural view of an energy storage system according to another embodiment of the present application.

In order to solve the above problems, as shown in FIG. 3, the energy storage system further includes a supplementary unit 1000 which is arranged outside the cabinet body 900 for the energy storage system to supplement electricity to an energy storage power station.

In the energy storage system, the supplementary unit 100 may be used or may not be used. If the supplementary unit 1000 is not used, the energy storage system is used as a commercial energy storage system. If the supplementary unit 1000 is used, the energy storage system is used as a supplementary cabinet. In this way, the energy storage system is not only used as the commercial energy storage system, but also used as the supplementary cabinet, which expands the functions of the energy storage system. In addition, there is no need to arrange a supplementary cabinet separately, and the energy storage system can be used as the supplementary cabinet by adding the supplementary unit 1000 in the energy storage system, which improves the flexibility of use.

Specifically, if the energy storage system is used as the commercial energy storage system, an output wire of the battery cluster is connected with the switching and current converging unit 301, and an output wire of the switching and current converging unit 301 is connected with an energy storage converter.

Specifically, if the energy storage system is used as the supplementary cabinet, the output wire of the battery cluster may be connected with the switching and current converging unit 301, an output wire of the switching and current converging unit 301 may be connected with the supplementary unit 1000, and an output wire of the supplementary unit 1000 is connected with a power station energy storage converter in the energy storage power station. Alternatively, the supplementary unit 1000 may be configured to be connected in series between the battery cluster module 100 and the switching and current converging unit 301. Specifically, an output wire of the battery cluster module 100 is connected with the supplementary unit 1000, an output wire of the supplementary unit 1000 is connected with the switching and current converging unit 301, and an output wire of the switching and current converging unit 301 is configured to be connected with a power station energy storage converter in the energy storage power station. If the energy storage system is used as the commercial energy storage system, the connection between the output wire of the battery cluster module 100 and the supplementary unit 1000 and the connection between the output wire of the supplementary unit 1000 and the switching and current converging unit 301 are disconnected, and the output wire of the battery cluster module 100 and the switching and current converging unit 301 are connected with each other.

For the convenience of wiring, the supplementary unit 1000 is preferably connected in series between the battery cluster module 100 and the switching and current converging unit 301.

Based on the above wiring structure, if the threading plate 904 is provided, the threading plate 904 may be detachably arranged on the cabinet body 900, and the number of the threading plate 904 is two. One threading plate 904 is a first threading plate, and the other threading plate 904 is a second threading plate. If the energy storage system is used as the commercial energy storage system, the first threading plate is arranged on the cabinet body 900 for an output wire of the switching and current converging unit 301 to pass through.

If the energy storage system is used as the supplementary cabinet, the second threading plate is arranged on the cabinet body 900 for an output wire of the switching and current converging unit 301 to pass through and for an output wire and an input wire of the supplementary unit 1000 to pass through. In this case, the threading structure includes the first threading plate and the second threading plate. In the above structure, one threading plate 904 may be provided for an output wire and an input wire of the supplementary unit 1000 to pass through. Moreover, the cabinet body 900 is further provided with a threading hole 908 for the output wire of the switching and current converging unit 301 to pass through. In this case, the threading structure includes the threading hole 908 and the threading plate 904.

The specific structure of the supplementary unit 1000 is selected according to actual needs. Specifically, the supplementary unit 1000 includes a fixed bracket 1001 and a converter 1002, the fixed bracket 1001 is fixed outside the cabinet body 900, and the converter 1002 is arranged on the fixed bracket 1001. It can be understood that the converter is a direct current/direct current converter, that is a DC-DC converter, and the converter 1002 is in one-to-one correspondence to the battery cluster.

In practical application, the supplementary unit 1000 may further include other devices, which are not limited to the above converter 1002.

The specific structure of the fixed bracket 1001 is selected according to actual needs, which is not limited in this embodiment.

For the convenience of maintenance, the supplementary unit 1000 is detachably arranged on the cabinet body 900. Specifically, the converter 1002 may be detachably connected with the fixed bracket 1001, and/or, the fixed bracket 1001 may be detachably connected with the cabinet body 900.

The specific position of the supplementary unit 1000 is selected according to actual needs. In an embodiment, the supplementary unit 1000 is arranged on a side plate of the cabinet body 900. Specifically, the supplementary unit 1000 is arranged on a side plate of the cabinet main body 903.

Since the supplementary unit 1000 needs to be connected with the switching and current converging unit 301, the supplementary unit 1000 may be located on a side, proximate to the switching and current converging unit 301, of the cabinet body 900 for reasonable layout.

Specifically, in the cabinet body 900, the side plate provided with the supplementary unit 1000 is provided with the threading structure and the fire-fighting gas outlet 403, the threading structure is lower than the fire-fighting gas outlet 403, and the supplementary unit 1000 is located between the threading structure and the fire-fighting gas outlet 403.

The energy storage system according to the above embodiments can meet the requirements of small occupied area and high heat dissipation efficiency, realize back-to-back arrangement (a side, away from the cabinet door 905, of the cabinet body 900 is a back side). In addition, the equipment can be expanded, specifically, the energy storage system is expanded into a supplementary cabinet for supplementing the electricity to the energy storage power station.

Based on the above energy storage system according to the above embodiments, an energy storage power station is further provided according to an embodiment of the present application. The energy storage power station includes the energy storage system including the supplementary unit 1000 in the above embodiments.

Since the energy storage system according to the above embodiments has the above technical effects and the energy storage power station includes the above energy storage system, the energy storage power station also has corresponding technical effects, which is not repeated herein.

The above illustration of the disclosed embodiments enables those skilled in the art to implement or use the present application. Various modifications to the embodiments will be apparent to those skilled in the art, and the general principle defined herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. An energy storage system, comprising:
a cabinet body;
a control module; and
a battery cluster module and a liquid cooling module, wherein the battery cluster module and the liquid cooling module are arranged in the cabinet body; wherein
the battery cluster module comprises at least two battery clusters arranged side by side;
the liquid cooling module comprises a liquid cooling unit and a liquid cooling pipeline, the liquid cooling unit is configured to supply a coolant, and the liquid cooling pipeline is configured to connect the liquid cooling unit with the battery cluster module to form a liquid cooling circuit;
the control module comprises a switching and current converging unit arranged in the cabinet body, wherein the switching and current converging unit is configured to perform current convergence of any two battery clusters in parallel connection of the at least two battery clusters, and control an on-off state of the battery cluster module and control a battery cluster management unit;
in a height direction of the cabinet body, at least one of the battery clusters and the liquid cooling unit are sequentially distributed, and at least another one of the battery clusters and the switching and current converging unit are sequentially distributed.

2. The energy storage system according to claim 1, wherein any two of the battery clusters are sequentially distributed in an X-direction; and the liquid cooling unit and the switching and current converging unit are sequentially distributed in the X-direction.

3. The energy storage system according to claim 2, wherein in a longitudinal section of the cabinet body, the liquid cooling unit and the switching and current converging unit are distributed along a diagonal of the longitudinal section; wherein the longitudinal section is parallel to the X-direction and the height direction of the cabinet body.

4. The energy storage system according to claim 3, further comprising: a supplementary unit, wherein the supplementary unit is arranged outside the cabinet body for the energy storage system to supplement electricity to an energy storage power station.

5. The energy storage system according to claim 2, further comprising: a supplementary unit, wherein the supplementary unit is arranged outside the cabinet body for the energy storage system to supplement electricity to an energy storage power station.

6. The energy storage system according to claim 1, wherein the cabinet body is provided with at least one battery compartment for accommodating the at least two battery clusters, and a liquid cooling unit compartment for accommodating the liquid cooling unit;

wherein in the height direction of the cabinet body, the at least one battery compartment and the liquid cooling unit are sequentially distributed.

7. The energy storage system according to claim 6, wherein the cabinet body is provided with two cabinet doors, the number of the at least one battery compartment is two or more, one of the cabinet doors is configured to seal the liquid cooling unit compartment and at least one of the two or more battery compartments, the other of the cabinet doors is configured to seal other battery compartments of the two or more battery compartments, and the switching and current converging unit is provided in one of the other battery compartments.

8. The energy storage system according to claim 1, wherein a side plate, proximate to the switching and current converging unit, of the cabinet body is provided with a threading structure for an output wire of the switching and current converging unit to pass through.

9. The energy storage system according to claim 1, wherein the cabinet body is provided with a liquid cooling unit compartment for accommodating the liquid cooling unit, and a liquid cooling air inlet and a liquid cooling air outlet both in communication with the liquid cooling unit compartment;

wherein the liquid cooling air outlet is provided with an air guiding assembly, and the air guiding assembly is configured to guide the liquid cooling air outlet to supply air toward a side away from the liquid cooling air inlet.

10. The energy storage system according to claim 1, further comprising: a supplementary unit, wherein the supplementary unit is arranged outside the cabinet body for the energy storage system to supplement electricity to an energy storage power station.

11. The energy storage system according to claim 1, wherein the liquid cooling unit is arranged at a top end of at least one of the battery clusters, and the switching and current converging unit is arranged at a bottom end of at least another one of the battery clusters;

wherein the battery cluster arranged at a bottom end of the liquid cooling unit is a first battery cluster, and the battery cluster arranged at a top end of the switching and current converging unit is a second battery cluster;

the switching and current converging unit is arranged at a bottom end of the cabinet body, the liquid cooling unit is arranged at a top end of the cabinet body, the first battery cluster extends from the bottom end of the cabinet body to the liquid cooling unit, and the second battery cluster extends from the switching and current converging unit to the top end of the cabinet body;

the first battery cluster is adjacent to the second battery cluster; or a third battery cluster is provided between the first battery cluster and the second battery cluster, and the third battery cluster extends from the bottom end of the cabinet body to the top end of the cabinet body.

12. The energy storage system according to claim 11, further comprising: a supplementary unit, wherein the supplementary unit is arranged outside the cabinet body for the energy storage system to supplement electricity to an energy storage power station.

13. The energy storage system according to claim 1, wherein the cabinet body is provided with at least one battery compartment for accommodating the at least two battery clusters, and the switching and current converging unit is arranged in one of the at least one battery compartment.

14. An energy storage power station, comprising the energy storage system according to claim 10.

\* \* \* \* \*